US008620262B2

(12) United States Patent
Cai et al.

(10) Patent No.: US 8,620,262 B2
(45) Date of Patent: Dec. 31, 2013

(54) ADVICE OF CHARGING (AOC) SERVICES IN IMS NETWORKS

(75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 950 days.

(21) Appl. No.: 12/357,208

(22) Filed: Jan. 21, 2009

(65) Prior Publication Data

US 2010/0184403 A1    Jul. 22, 2010

(51) Int. Cl.
*H04M 11/00* (2006.01)
*H04M 15/00* (2006.01)

(52) U.S. Cl.
USPC ................. 455/406; 379/114.04; 379/114.05; 379/114.28

(58) Field of Classification Search
USPC .......................................... 455/406
See application file for complete search history.

(56) References Cited

U.S. PATENT DOCUMENTS

| 7,711,351 | B2 * | 5/2010 | Stafford et al. | 455/406 |
| 2011/0035446 | A1 * | 2/2011 | Goermer et al. | 709/204 |

FOREIGN PATENT DOCUMENTS

WO    WO 2009/155990    * 12/2009

* cited by examiner

*Primary Examiner* — Huy C Ho
(74) *Attorney, Agent, or Firm* — Duft, Bornsen & Fettig, LLP

(57) ABSTRACT

IMS networks, subscriber databases, and methods are disclosed for providing AoC services in IMS networks. The subscriber database is provisioned with AoC indicators for IMS users that subscribe to AoC services. An S-CSCF in an IMS network receives a first register message from an IMS user, and transmits a second register message to the subscriber database. In response to the second register message, the subscriber database identifies an AoC indicator for the IMS user that is registering, inserts the AoC indicator in a third register message, and transmits the third register message to the S-CSCF. The S-CSCF then stores the AoC indicator for the IMS user. If a signaling message is received for a session involving the IMS user, then the S-CSCF will forward the AoC indicator for the IMS user to an AoC application server, which collects the appropriate AoC information and provides the information to the IMS user.

19 Claims, 11 Drawing Sheets

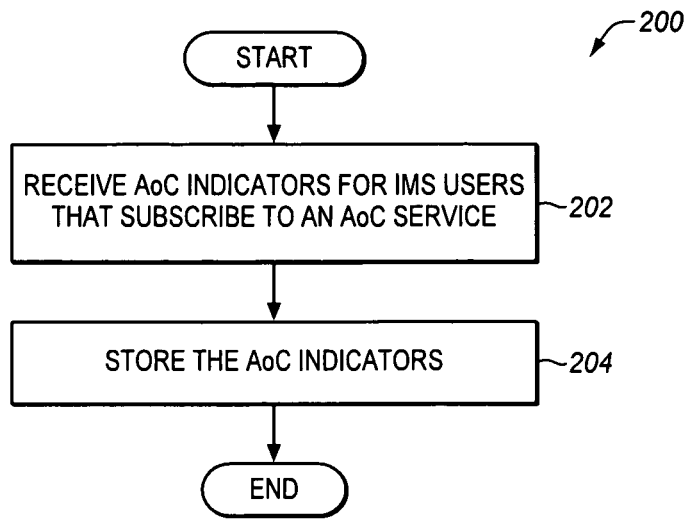
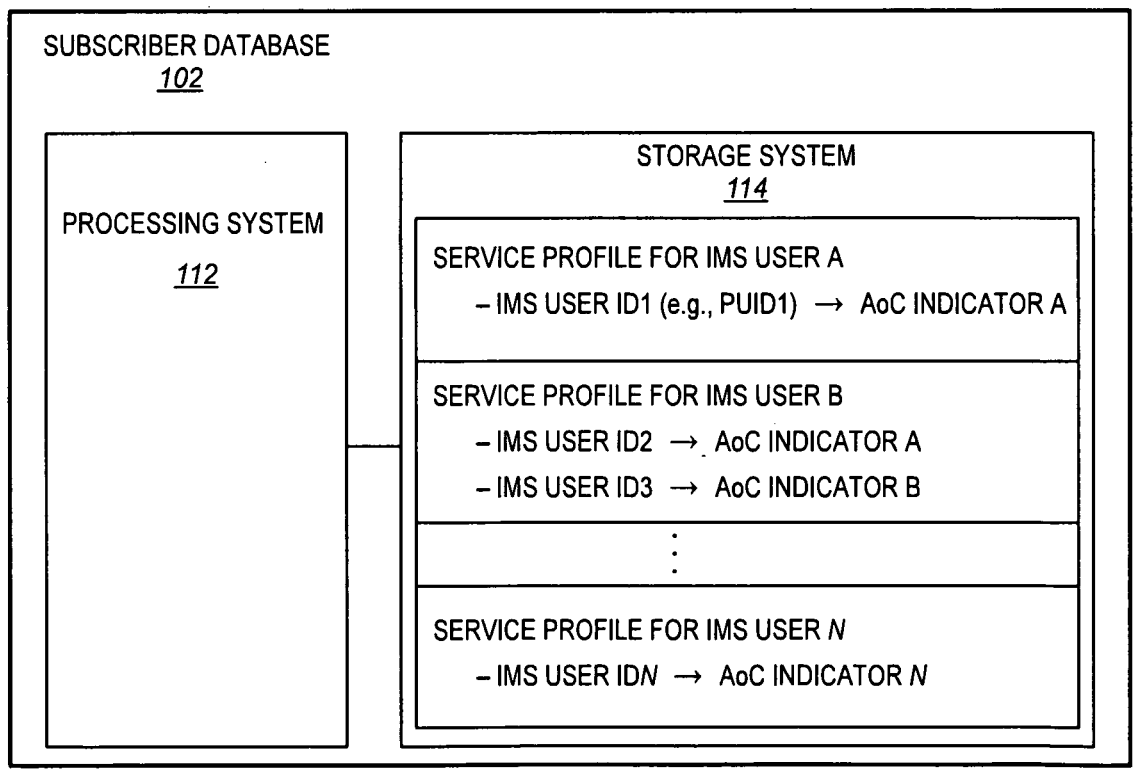

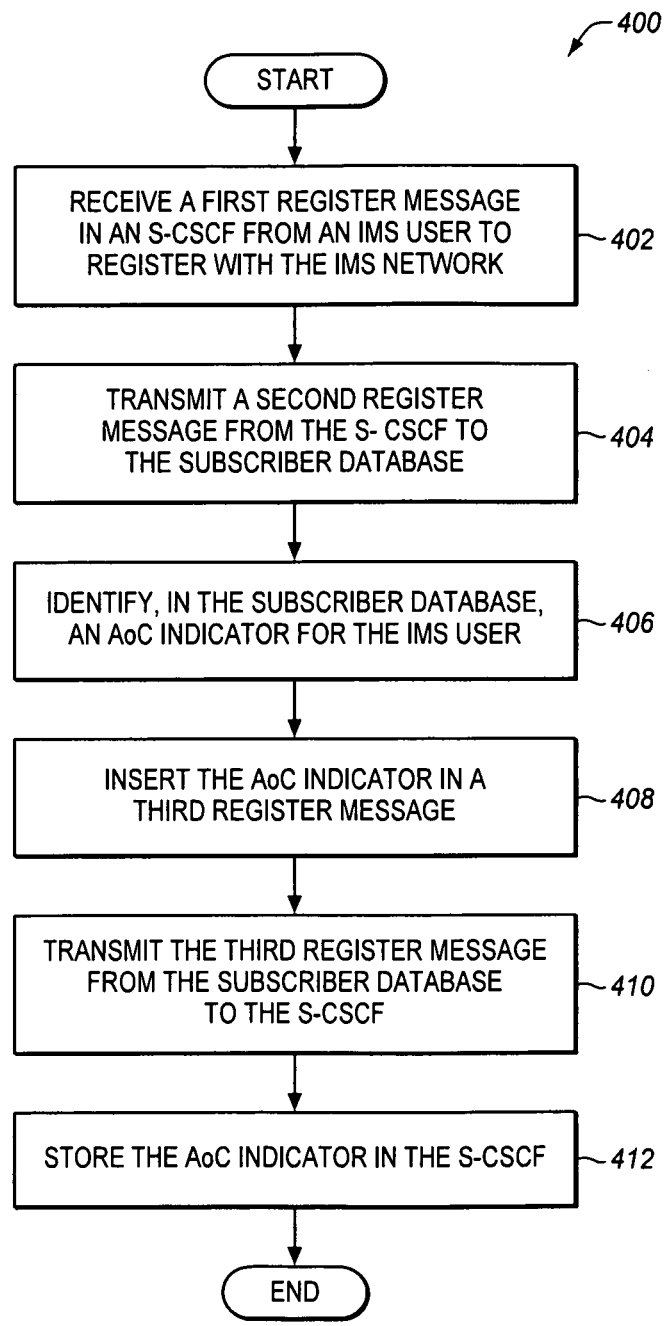

FIG. 7

| AoC APPLICATION SERVER *106* ||
|---|---|
| AoC DATA STRUCTURE *700* ||
| AoC INDICATOR A | AoC CATEGORY A<br>-TYPE OF AoC INFO (e.g., RATE FOR A SESSION)<br>-WHEN TO PROVIDE AoC INFO (e.g., BEGINNING OF SESSION)<br>-HOW TO PROVIDE AoC INFO (e.g., VOICE ANNOUNCEMENT) |
| AoC INDICATOR B | AoC CATEGORY B<br>-TYPE OF AoC INFO (e.g., CHARGE OF A SESSION)<br>-WHEN TO PROVIDE AoC INFO (e.g., END OF SESSION)<br>-HOW TO PROVIDE AoC INFO (e.g., TEXT MESSAGE) |
| ⋮ | ⋮ |
| AoC INDICATOR N | AoC CATEGORY N<br>-TYPE OF AoC INFO<br>-WHEN TO PROVIDE AoC INFO<br>-HOW TO PROVIDE AoC INFO |

ADVICE OF CHARGING (AOC) SERVICES IN IMS NETWORKS

BACKGROUND OF THE INVENTION

1. Field of the Invention

The invention is related to the field of IMS networks and, in particular, to providing AoC services in IMS networks.

2. Statement of the Problem

Advice of Charging (AoC) is a service or feature in telecommunication networks that provides a subscriber with charging information for telecommunication services. The charging information may comprise a rate for a call (e.g., a charge per unit time, such as $0.10 per minute), a change in rate during a call, an accumulated usage or charge for a call just completed (e.g., call charge=4 minutes or $0.40), accumulated usage or charge for a billing period (e.g., total billing period=100 minutes or $10.00), remaining balance in an account (e.g., remaining balance=33 minutes), special charging, etc. The AoC service may provide the charging information to the subscriber at the start of a call, during a call, or at the end of a call. The AoC service may also provide the charging information in a variety of ways, such as through a visual display, a distinctive alert, an audible tone or announcement, or a combination of these.

To implement an AoC service, a switch in the telecommunication network determines the charging information that is available for presentation to the subscriber, and collects the charging information. For example, the switch typically includes a rate table that indicates the rate for a particular call (e.g., based on calling party number and called party number). The switch may perform this operation upon initiation of a call, during a call (mid-call), or at the end of a call. The switch then presents the charging information to the subscriber in a desired format, such as a visual display, distinctive alert, announcement, etc.

One type of communication network gaining popularity is an IP Multimedia Subsystem (IMS) network. As set forth in the 3$^{rd}$ Generation Partnership Project (3GPP or 3GPP2), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

One problem with IMS networks is that AoC services have not been effectively implemented. In traditional telecommunication networks (e.g., a PSTN, an ANSI-41 network, a UMTS/GSM network, etc), the switches provide the AoC services. However, traditional switches are not used in a packet-based IMS network as a serving network node, and thus AoC services cannot be provided by switches in an IMS network. It would be beneficial to both IMS subscribers and service providers that are using IMS networks to effectively implement AoC services in IMS networks.

SUMMARY OF THE SOLUTION

Embodiments of the invention solve the above and other related problems by implementing AoC services in IMS networks. Instead of using switches in a telecommunication network to provide the AoC services, a subscriber database (e.g., an HSS) in an IMS network is provisioned with AoC indicators for IMS users. For example, the subscriber database may be provisioned with an AoC indicator that is associated with each IMS user ID (i.e., PUID) of an IMS user. The subscriber database is able to forward the AoC indicator for an individual IMS user to other network elements in the IMS network. Thus, when a network element determines that a session has been initiated for an IMS user, the network element forwards the AoC indicator for the IMS user to an AoC application server in the IMS network. The AoC indicator provides the AoC application server with information on a certain charging table, a charging method, an AoC delivery time (e.g., beginning of session, mid-session, end of session), etc. The AoC application server is then able to collect the appropriate AoC information based on the AoC indicator, and provide the AoC information to the IMS user. By provisioning the subscriber database with AoC indicators, the AoC application server need only receive the AoC indicator once during a session to identify the proper AoC information desired by an IMS user, and provide the AoC information to the IMS user at the appropriate time.

One embodiment of the invention comprises a subscriber database of an IMS network that is operable to provide AoC services. The subscriber database is operable to receive AoC indicators for IMS users that subscribe to an AoC service in the IMS network. The subscriber database is further operable to store the AoC indicators for the IMS users that subscribe to an AoC service. For example, the subscriber database may store an AoC indicator that is associated with an IMS user ID of an IMS user. The AoC indicator for an individual IMS user may thus be identified in the subscriber database through the IMS user ID.

Another embodiment comprises an IMS network operable to provide AoC services. The IMS network includes an S-CSCF that is operable to receive a first register message (i.e., a SIP REGISTER) from an IMS user to register with the IMS network, and to transmit a second register message (i.e., a Diameter request message) to the subscriber database. In response to the second register message, the subscriber database is operable to identify an AoC indicator for the IMS user that is registering, such as through the user's IMS user ID. The subscriber database is further operable to insert the AoC indicator in a third register message (i.e., a Diameter answer message), and transmit the third register message to the S-CSCF. In response to the third register message from the subscriber database, the S-CSCF is further operable to store the AoC indicator for the IMS user.

Assume in yet another embodiment that the IMS user either initiates a session or is invited into a session in the IMS network. The S-CSCF is further operable to receive a signaling message for the session involving the IMS user. The S-CSCF is further operable to determine whether the IMS user subscribes to an AoC service. If the IMS user subscribes to an AoC service, then the S-CSCF is further operable to identify the AoC indicator for the IMS user, which was previously stored in the S-CSCF when the IMS user registered with the IMS network. The S-CSCF is further operable to insert the AoC indicator in the signaling message, and transmit the signaling message to an AoC application server.

The AoC application server stores an AoC data structure that associates AoC indicators with AoC categories. The AoC categories define the AoC service subscribed to by IMS users. For example, the AoC categories may define what type of AoC information an IMS user desires to receive as part of the AoC service, such as a rate for a session, a change in session rate, an accumulated usage or charge for a session just completed, an accumulated usage or charge for a billing period, remaining balance in an account, special charging, etc. The AoC application server is further operable to receive the signaling message from the S-CSCF, which includes the AoC indicator for the IMS user. The AoC application server is further operable to process the AoC indicator for the IMS user and the AoC data structure to identify an AoC category defined for the AoC indicator. The AoC application server is further operable to request the AoC information from a charging system based on the AoC category for the IMS user. The AoC application server is then further operable to receive the AoC information from the charging system, and to provide the AoC information to the IMS user. The IMS user may then receive the AoC information audibly, visually, etc, from the AoC application server.

The invention may include other exemplary embodiments described below.

DESCRIPTION OF THE DRAWINGS

The same reference number represents the same element or same type of element on all drawings.

FIG. 2 is a flow chart illustrating a method of provisioning a subscriber database with AoC indicators in an exemplary embodiment of the invention.

FIG. 3 illustrates a storage system storing service profiles for IMS users in an exemplary embodiment of the invention.

FIG. 4 is a flow chart illustrating a method of providing an AoC indicator during registration in an exemplary embodiment of the invention.

FIG. 7 illustrates an AoC data structure in an exemplary embodiment of the invention.

DETAILED DESCRIPTION OF THE INVENTION

FIGS. 1-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
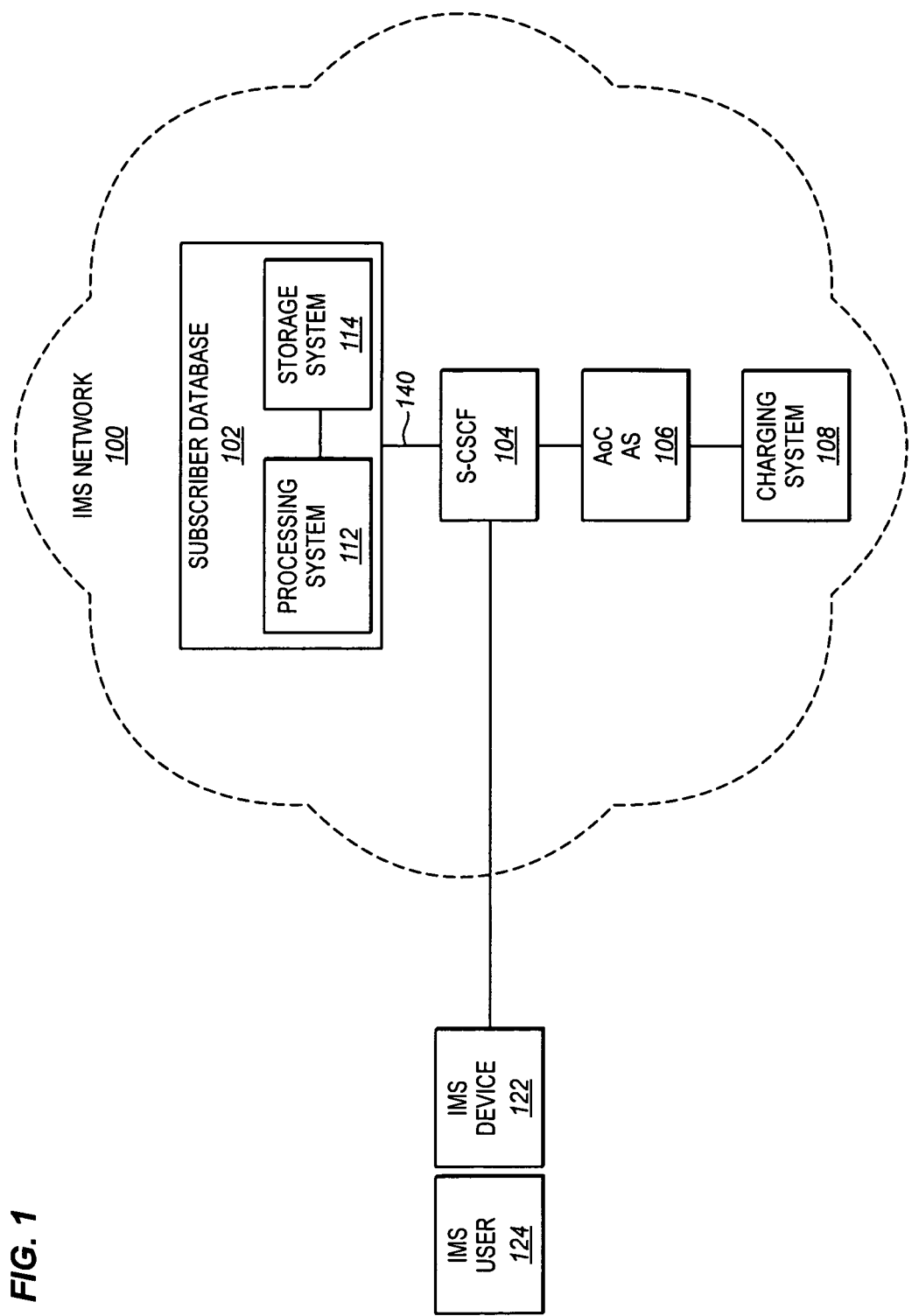
FIG. 1 illustrates an IMS network in an exemplary embodiment of the invention.

FIG. 1 illustrates an IMS network 100 in an exemplary embodiment of the invention. IMS network 100 includes a subscriber database 102, a Serving-Call Session Control Function (S-CSCF) 104, an AoC application server (AS) 106, and a charging system 108. Subscriber database 102 comprises any server(s), function(s), or other system(s) operable to store service profiles or other information for IMS users. One example of a subscriber database is a Home Subscriber Server (HSS). In this embodiment, subscriber database 102 includes a processing system 112 and a storage system 114.

S-CSCF 104 comprises any server(s), function(s), or other system(s) operable to provide session control for an IMS device 122 that is accessing services within IMS network 100. IMS device 122 (also referred to as user equipment (UE)) comprises any wireline (or fixed-line) device or mobile device that is able to register with IMS network 100 to receive services. IMS device 122 is operated by an IMS user 124 that has subscribed to an AoC service being provided by IMS network 100. Although not specifically shown in FIG. 1, the interface 140 between subscriber database 102 and S-CSCF 104 may comprise a Cx interface.

AoC application server 106 comprises any server(s), function(s), or other system(s) operable to provide AoC services to IMS users. Charging system 108 comprises any server(s), function(s), or other system(s) operable to perform charging for sessions in IMS network 100. Charging system 108 may perform online charging for IMS sessions, and thus may comprise an Online Charging System (OCS), or some other online or prepaid charging element. Charging system 108 may alternatively or additionally perform offline charging for IMS sessions, and thus may comprise a Charging Collector Function (CCF), a Charging Data Function/Charging Gateway Function (CDF/CGF), or some other offline or postpaid charging element. Those skilled in the art will appreciate that charging system 108 may include a rating function, an Account Balance Management Function (ABMF), or other charging functions that are not shown for the sake of brevity.

IMS network 100 may include other network elements that are not shown in FIG. 1 for the sake of brevity, such as a Proxy-CSCF, an Interrogate-CSCF, or other network elements. Also, the network elements in IMS network 100 may be implemented as hardware, software, firmware, or some combination of these. For example, processing system 112 and storage system 114 of subscriber database 102 may be implemented as one or more processors executing instructions that are stored in storage system 114. Alternatively, processing system 112 and/or storage system 114 may be implemented as a programmable gate array, a circuit or circuitry, logic, or some other physical electronic implementation that is not entirely software based.

In this embodiment, AoC services are provided in part by provisioning subscriber database 102 with AoC indicators for those IMS users that subscribe to AoC services. FIG. 2 is a flow chart illustrating a method 200 of provisioning subscriber database 102 with AoC indicators in an exemplary embodiment of the invention. The steps of method 200 will be described with reference to IMS network 100 in FIG. 1. The steps of the flow chart in FIG. 2 are not all inclusive and may include other steps not shown.

In step 202, processing system 112 of subscriber database 102 receives AoC indicators for IMS users that subscribe to an AoC service. An AoC indicator comprises any data or information that indicates a particular AoC service subscribed to by an IMS user. For example, a service provider may offer multiple categories of AoC services (referred to herein as AoC categories). An AoC category may define what type of AoC information the IMS user desires to receive, such as a rate for a session, a change in session rate, an accumulated usage or charge for a session just completed, an accumulated usage or charge for a billing period, remaining balance in an account, special charging, etc. An AoC category may also define how and when the IMS user desires to receive the AoC information, such as beginning of session, mid-session, or end of session, or via text message, voice announcement, etc. The AoC indicator received by processing system 112 thus indicates the AoC category subscribed to by an IMS user. In step 204, processing system 112 stores the AoC indicators in storage system 114 for the IMS users that subscribe to an AoC service.

The IMS users (or their associated IMS devices) each have one or more IMS users IDs, which are some type of number, address, or character string that identifies an IMS user or IMS device within IMS network 100. For example, an IMS user ID may comprise a Public User ID (PUID), which is typically used in an IMS network to identify an IMS user. One example of a PUID is a SIP URI. Processing system 112 may thus store an AoC indicator for an IMS user with an associated IMS user ID of the IMS user. For example, if an IMS user has one PUID, then processing system 112 stores an AoC indicator that is associated with the PUID of the IMS user in storage system 114. If an IMS user has multiple PUIDs, then processing system 112 stores an AoC indicator that is associated with each of the PUIDs of the IMS user in storage system 114.

Processing system 112 may store the AoC indicators in a service profile for the IMS users. FIG. 3 illustrates storage system 114 storing service profiles for IMS users in an exemplary embodiment of the invention. Storage system 114 stores service profiles for IMS users A, B, . . . , N. As is evident in FIG. 3, the service profile for IMS user A includes an AoC indicator A that is associated with an IMS user ID for IMS user A (e.g., IMS user ID1). The service profile for IMS user B includes multiple IMS users ID (e.g., IMS user ID2 and IMS user ID3). For each IMS user ID, the service profile is provisioned with an AoC indicator. For example, IMS user ID2 is associated with AoC indicator A, and IMS user ID3 is associated with AoC indicator B. In this embodiment and other embodiments described herein, a single AoC indicator may be associated with each IMS user ID. Also, IMS users may share the same AoC indicator if the IMS users subscribe to similar AoC services.

In provisioning subscriber database 102 as illustrated in FIG. 2, the service provider operating IMS network 100 may supply the AoC indicators used to provision subscriber database 102. For example, when an IMS user subscribes to an AoC service, the service provider may provision the service profile for the IMS user as stored in subscriber database 102 with the appropriate AoC indicator. Alternatively, an IMS user may provision subscriber database 102 through a web site provided by the service provider, may enter feature codes into an IMS device that is interpreted by IMS network, etc.

With subscriber database 102 provisioned with the AoC indicators, subscriber database 102 is able to provide the AoC indicators to other network elements (i.e., S-CSCF 104) in IMS network 100 in FIG. 1 for sessions involving IMS users. The network elements further forward the AoC indicators to AoC application server 106. AoC application server 106 is thus able to determine what type of AoC information is desired by IMS users, and when and how to provide the AoC information to the IMS users based on the AoC indicators. Subscriber database 102 may provide an AoC indicator for an IMS user to other network elements in IMS network 100 during registration of the IMS user, which is further described in FIG. 4.

FIG. 4 is a flow chart illustrating a method 400 of providing an AoC indicator during registration in an exemplary embodiment of the invention. The steps of method 400 will be described with reference to IMS network 100 in FIG. 1. The steps of the flow chart in FIG. 4 are not all inclusive and may include other steps not shown.

In step 402, S-CSCF 104 receives a first register message from IMS user 124 to register with IMS network 100. Those skilled in the art will appreciate that the reference to IMS user 124 may also apply to IMS device 122 that actually generates and transmits the first register message to IMS network 100. The first register message received from IMS user 124 may comprise a SIP REGISTER or a message of another protocol. In step 404, S-CSCF 104 transmits a second register message to subscriber database 102. The second register message may comprise a Diameter request message that is related to registration, such as a Diameter Server Assignment Request (SAR) that is used to acquire a service profile. The second register message includes an IMS user ID for IMS user 124, such as a PUID for IMS user 124. The IMS user ID may be inserted in the second register message by S-CSCF 104, by IMS device 122, or by another network element.

In response to the second register message, subscriber database 102 identifies an AoC indicator for IMS user 124 in step 406. For example, subscriber database 102 may process the register message to identify the header that includes the IMS user ID for IMS user 124. Based on the IMS user ID, subscriber database 102 may identify the service profile for IMS user 124, which is provisioned with the AoC indicator for IMS user 124. As IMS user 124 may have multiple IMS user IDs, subscriber database 102 may further identify the AoC indicator that is associated with this particular IMS user ID that is included in the second register message.

In step 408, subscriber database 102 inserts the AoC indicator in a third register message. The third register message may comprise a Diameter answer message that is related to registration, such as a Diameter Server Assignment Answer (SAA) that is used to provide a service profile. In step 410, subscriber database 102 transmits the third register message to S-CSCF 104. As mentioned above, subscriber database 102 may transmit the third register message, which includes the AoC indicator, to S-CSCF 102 over a Cx interface. For example, subscriber database 102 may insert the AoC indicator as a new XML attribute of the User-Data AVP of a Diameter SAA, and transmit the Diameter SAA to the S-CSCF over the Cx interface.

In response to the third register message, S-CSCF 104 stores the AoC indicator for IMS user 124 in step 412. S-CSCF 104 will store the AoC indicator for IMS user 124 while IMS user 124 is registered with IMS network 100.

The AoC indicator for IMS user 124 may be part of the service profile for IMS user 124. Thus, as part of registration, S-CSCF 104 retrieves and stores the service profile of the registering IMS user. If the AoC indicator for IMS user 124 is part of the service profile, then S-CSCF 104 is able to acquire the AoC indicator for IMS user 124 when retrieving and storing the service profile.

After IMS user 124 is registered with IMS network 100, IMS user 124 may dynamically change one or more AoC indicators as stored in subscriber database 102. To change an AoC indicator, IMS user 124 may enter an instruction in IMS device 122, which forwards the instruction to S-CSCF 104, such as in the form of a SIP message. S-CSCF 104 may then forward the instruction to subscriber database 102, such as in the form of a Diameter message. In response to the instruction, subscriber database 102 changes an AoC indicator for IMS user 124 either permanently or temporarily for a session. For example, IMS user 124 may enter a feature code into IMS device 122 indicating a change to an existing AoC indicator, and may also enter a feature code indicating the new AoC indicator. IMS device 122 then transmits the feature codes to S-CSCF 104 in one or more signaling messages. S-CSCF 104 processes the feature codes in the signaling messages, and generates an instruction to subscriber database 102 to make the desired changes. In response to the instruction, subscriber database 102 changes the existing AoC indicator for IMS user 124 to the new AoC indicator. The feature codes may also indicate whether the change is permanent or temporary for a session.

When S-CSCF 104 has retrieved and stored the AoC indicator for IMS user 124, S-CSCF 104 can share the AoC indicator with AoC application server 106, such as when IMS user 124 either initiates a session or is invited into a session. AoC application server 106 may then provide the AoC service to IMS user 124, as described in FIGS. 5-8.

Figure 5:
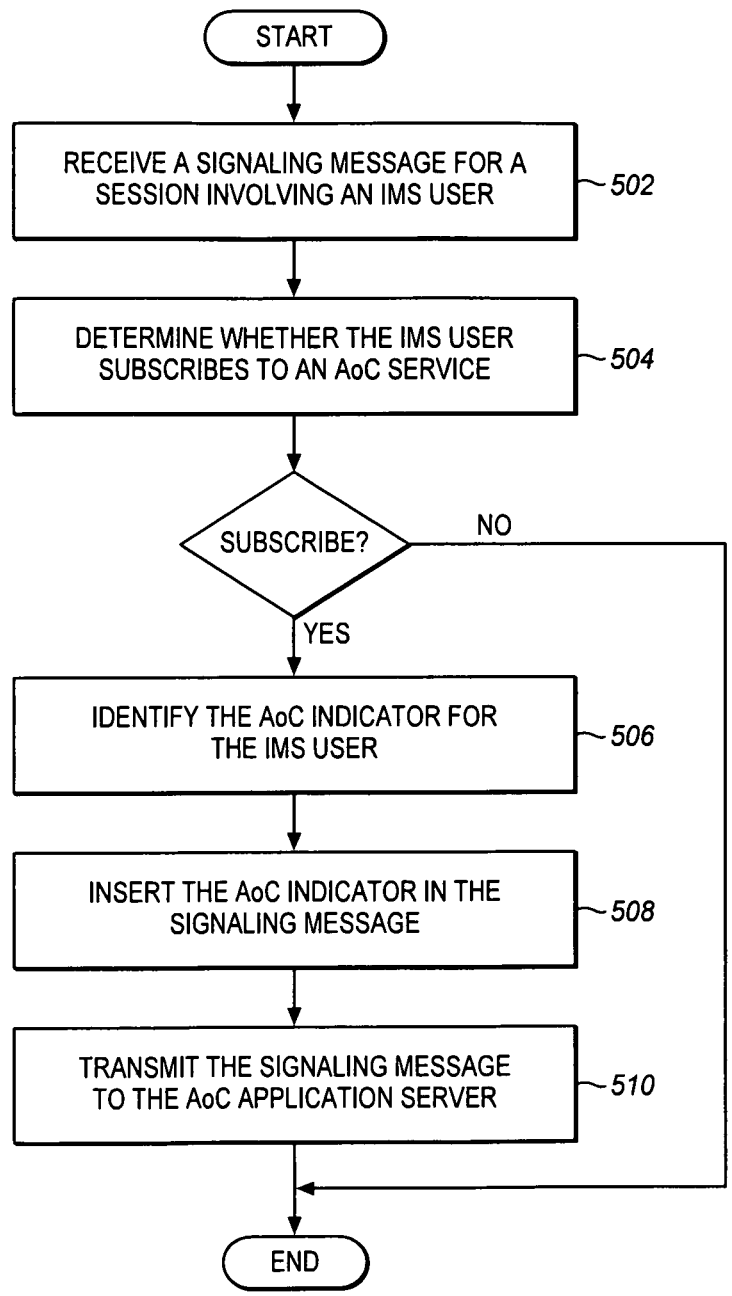
FIG. 5 is a flow chart illustrating a method of providing an AoC service in an exemplary embodiment of the invention.
Figure 6:
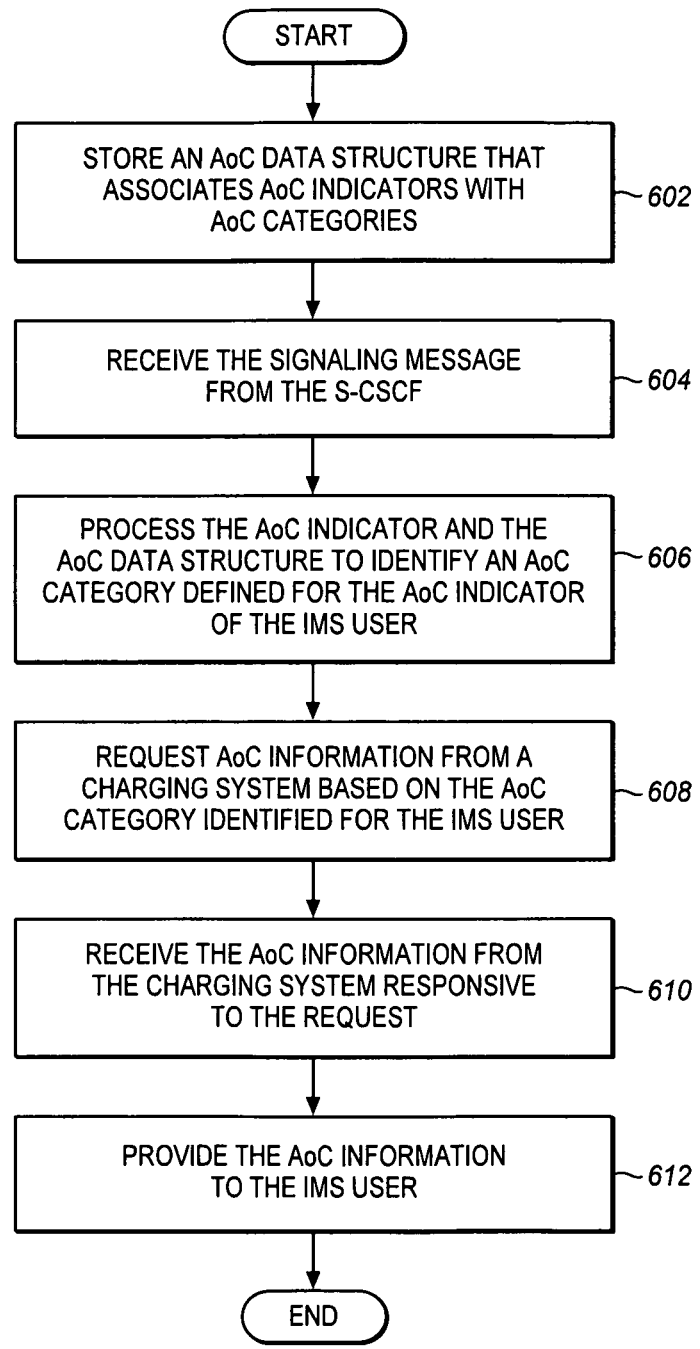
FIG. 6 is a flow chart illustrating another method of providing an AoC service in an exemplary embodiment of the invention.
Figure 8:
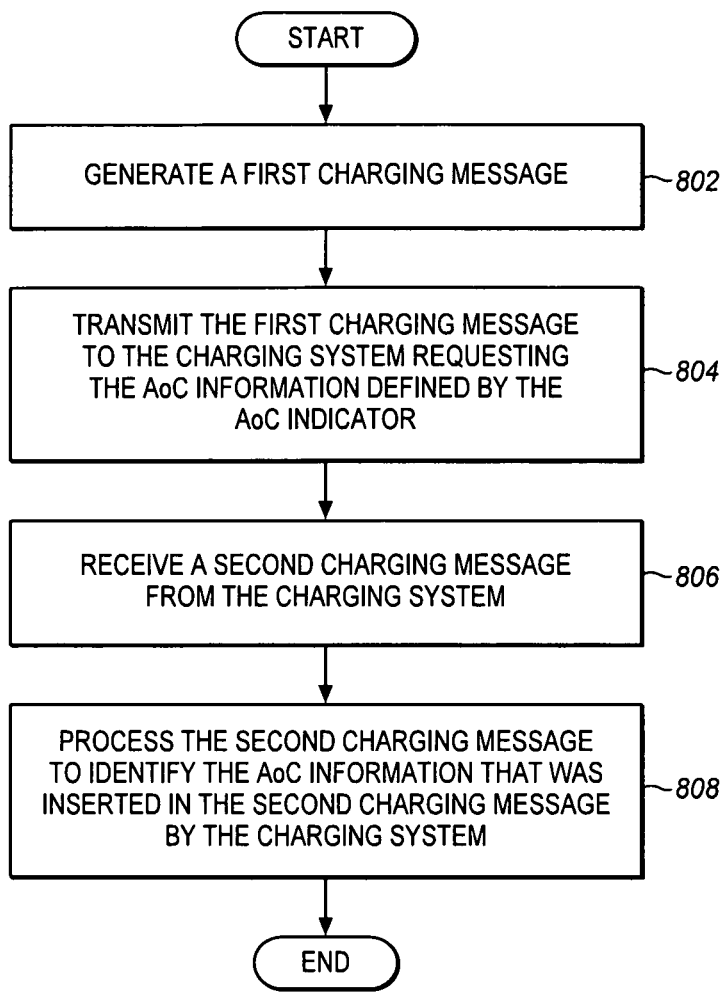
FIG. 8 is a flow chart illustrating another method of providing an AoC service in an exemplary embodiment of the invention.

FIGS. 5, 6, and 8 are flow charts illustrating methods of providing the AoC service in exemplary embodiments of the invention. The steps of the methods will be described with reference to IMS network 100 in FIG. 1. The steps of the flow charts in FIGS. 5, 6, and 8 are not all inclusive and may include other steps not shown.

Assume for example that IMS user 124 either initiates a session or is invited into a session. In step 502, S-CSCF 104 receives a signaling message for the session. For example, S-CSCF 104 may receive a SIP INVITE initiating a session involving IMS user 124. In step 504, S-CSCF 104 determines whether IMS user 124 subscribes to an AoC service. S-CSCF 104 may process the service profile for IMS user 124, which was retrieved from subscriber database 102 during registration, to determine whether IMS user 124 subscribes to an AoC service. If IMS user 124 subscribes to an AoC service, then S-CSCF 104 identifies the AoC indicator for IMS user 124 in step 506. Again, S-CSCF 104 may identify the service profile for IMS user 124 based on the IMS user ID, and process the service profile to identify the AoC indicator that is associated with the IMS user ID. In step 508, S-CSCF 104 inserts the AoC indicator in the signaling message. For example, if the signaling message comprises a SIP INVITE, then S-CSCF 104 may insert the AoC indicator in a Supported header of the SIP INVITE. In step 510, S-CSCF 104 transmits the signaling message to AoC application server 106.

In FIG. 6, AoC application server 106 stores an AoC data structure that associates AoC indicators with AoC categories (step 602). As described above, an AoC category (also referred to as class or parameter) globally defines the AoC service subscribed to by IMS users. The AoC categories may thus define what type of AoC information an IMS user desires to receive as part of the AoC service, such as a rate for a session, a change in session rate, an accumulated usage or charge for a session just completed, an accumulated usage or charge for a billing period, remaining balance in an account, special charging, etc. The AoC category may also define how and when an IMS user desires to receive the AoC information, such as beginning of session, mid-session, or end of session, or via text message, voice announcement, etc. By inputting an AoC indicator into the AoC data structure, AoC application server 106 is able to determine an AoC category for an IMS user and what type of AoC information to collect for the AoC service. The service provider may pre-provision AoC application server 106 with the AoC data structure so that only an AoC indicator needs to be sent to AoC application server 106.

FIG. 7 illustrates an AoC data structure 700 in an exemplary embodiment of the invention. AoC data structure 700 lists a plurality of AoC indicators A, B, . . . , N. For each AoC indicator in AoC data structure 700, an AoC category is associated with the AoC indicator. For example, AoC indicator A is associated with AoC category A. AoC category A defines the type of AoC information desired by an IMS user, such as a rate for a session. AoC category A further defines when to provide the AoC information to the IMS user, such as at the beginning of the session. AoC category A further defines how to provide the AoC information, such as via a voice announcement. The definitions for each AoC category in FIG. 7 are merely examples, and those skilled in the art will appreciate that service providers may provision the AoC categories to have different definitions.

In step 604 of FIG. 6, AoC application server 106 receives the signaling message from S-CSCF 104 for the session involving IMS user 124. The signaling message includes the AoC indicator for IMS user 124. In step 606, AoC application server 106 processes the AoC indicator for IMS user 124 and AoC data structure 700 to identify an AoC category defined for the AoC indicator. The AoC category defines at least what type of AoC information that IMS user 124 desires to receive through the AoC service. The AoC category may also define how and when IMS user 124 desires to receive the AoC information. In step 608, AoC application server 106 requests the AoC information from charging system 108 based on the AoC category for IMS user 124. For example, if the AoC category for IMS user 124 defines that the AoC information to be provided is a rate for the session, then AoC application server 106 requests the rate for the session from charging system 108. If the AoC category for IMS user 124 defines that the AoC information to be provided is an accumulated charge for the session, then AoC application server 106 requests the accumulated charge for the session from charging system 108.

In step 610, AoC application server 106 receives the AoC information from charging system 108. In step 612, AoC application server 106 provides the AoC information to IMS user 124 based on the AoC category. AoC application server 106 may provide the AoC information in a variety of ways. In one embodiment, AoC application server 106 may insert the AoC information in a signaling message, such as a SIP INVITE, and transmit the signaling message to IMS user 124 through S-CSCF 104. IMS device 122 will then process the signaling message to identify the AoC information, and display the AoC information to IMS user 124. In another embodiment, AoC application server 106 may send the AoC information to a text/multimedia server, such as a SMS or MMS server, in IMS network 100 (not shown in FIG. 1). The text/multimedia server may then send the AoC information to IMS user 124 through a text or multimedia message. In yet another embodiment, AoC application server 106 may include voice announcement capabilities. Thus, AoC application server 106 may set up a bearer connection with IMS device 122 and play a voice announcement of the AoC information to IMS user 124. Before providing the AoC information to IMS user 124, AoC application server 106 processes the AoC category for IMS user 124 to determine how and when to provide the AoC information.

Because each IMS user is provisioned with an AoC indicator, subscriber database 102 only needs to transmit the AoC indicator to S-CSCF 104 during registration. Additionally, S-CSCF 104 only needs to forward the AoC indicator to AoC application server 106 responsive to a session event (i.e., initiation of a session). AoC application server 106 can then use the AoC indicator and the globally-defined AoC categories to determine how to provide the AoC service. As a result, detailed AoC service parameters do not need to be transmitted from subscriber database 102 to S-CSCF 104 or from S-CSCF 104 to AoC application server 106 for each session event, which saves significant network traffic.

FIG. 8 further illustrates how AoC application server 106 may request and receive the AoC information from charging system 108 as described in steps 608 and 610 in FIG. 6. First, in step 802, AoC application server 106 may generate a first charging message responsive to receiving the signaling message from S-CSCF 104. The first charging message may comprise a Diameter Rf message if charging system 108 comprises an offline charging system (OFCS), such as a Diameter Accounting Request (ACR). The first charging message may comprise a Diameter Ro message if charging system 108 comprises an online charging system (OCS), such as a Diameter Credit Control Request (CCR). In step 804, AoC application server 106 transmits the first charging message to charging system 108 requesting the AoC information defined by the AoC indicator. To request the AoC information, a new AVP of "AoC-Information" may be added to Diameter request and answer messages. The AoC-Information AVP may contain a Multiple-Service-Credit-Control (MSCC) AVP, which may contain requested and granted tariff and/or service unit AVPs, an AoC category AVP, and an AoC indicator AVP. These AVPs are optional, and AoC application server 106 may include the AoC category AVP in the MSCC AVP under the AoC-Information AVP.

In step 806, AoC application server 106 receives a second charging message from charging system 108 that includes the AoC information. The second charging message may comprise a Diameter Rf message, such as a Diameter Accounting Answer (ACA). The second charging message may comprise a Diameter Ro message, such as a Diameter Credit Control Answer (CCA). In step 808, AoC application server 106 processes the second charging message to identify the AoC information that was inserted in the second charging message by charging system 108. For example, AoC application server 106 may process the User-Data AVP or MSCC AVP of the AoC-Information AVP. The AoC indicator may be included in an XML attribute of the Diameter message In the above embodiments, AoC application server 106 includes AoC data structure 700 that is used to identify an AoC category based on the AoC identifier. In another embodiment, AoC data structure 700 may be implemented in charging system 108. In this embodiment, AoC application server 106 passes the AoC indicator to charging system 108. For example, AoC application server 106 may generate the first charging message responsive to receiving the signaling message from S-CSCF 104. AoC application server 106 may then insert the AoC indicator in a User-Data AVP or MSCC AVP with the AoC indicator XML attribute of the Diameter message. AoC application server 106 then transmits the first charging message to charging system 108.

Charging system 108 then processes the AoC indicator for IMS user 124 and the AoC data structure to identify an AoC category defined for the AoC indicator. Charging system 108 then identifies the appropriate AoC information based on the AoC category. Charging system 108 then inserts the AoC information in a second charging message, and transmits the second charging message to AoC application server 106. AoC application server 106 may then process the second charging message to identify the AoC information that was inserted in the second charging message by charging system 108.

Those skilled in the art will further appreciate that the functionality of AoC application server 106 may be implemented in charging system 108 in yet another embodiment. In this embodiment, S-CSCF 104 may contact charging system 108 directly (i.e., through an IMS-GW in the case of online charging) with the AoC indicator. For example, S-CSCF 104 may generate a first charging message, and insert the AoC indicator in a User-Data AVP or MSCC AVP with the AoC indicator XML attribute of the Diameter message. S-CSCF 104 may then transmit the first charging message to charging system 108. S-CSCF 104 then receives a second charging message from charging system 108 that includes the AoC information, and processes the second charging message to identify the AoC information that was inserted in the second charging message by charging system 108.

EXAMPLE

Figure 9:
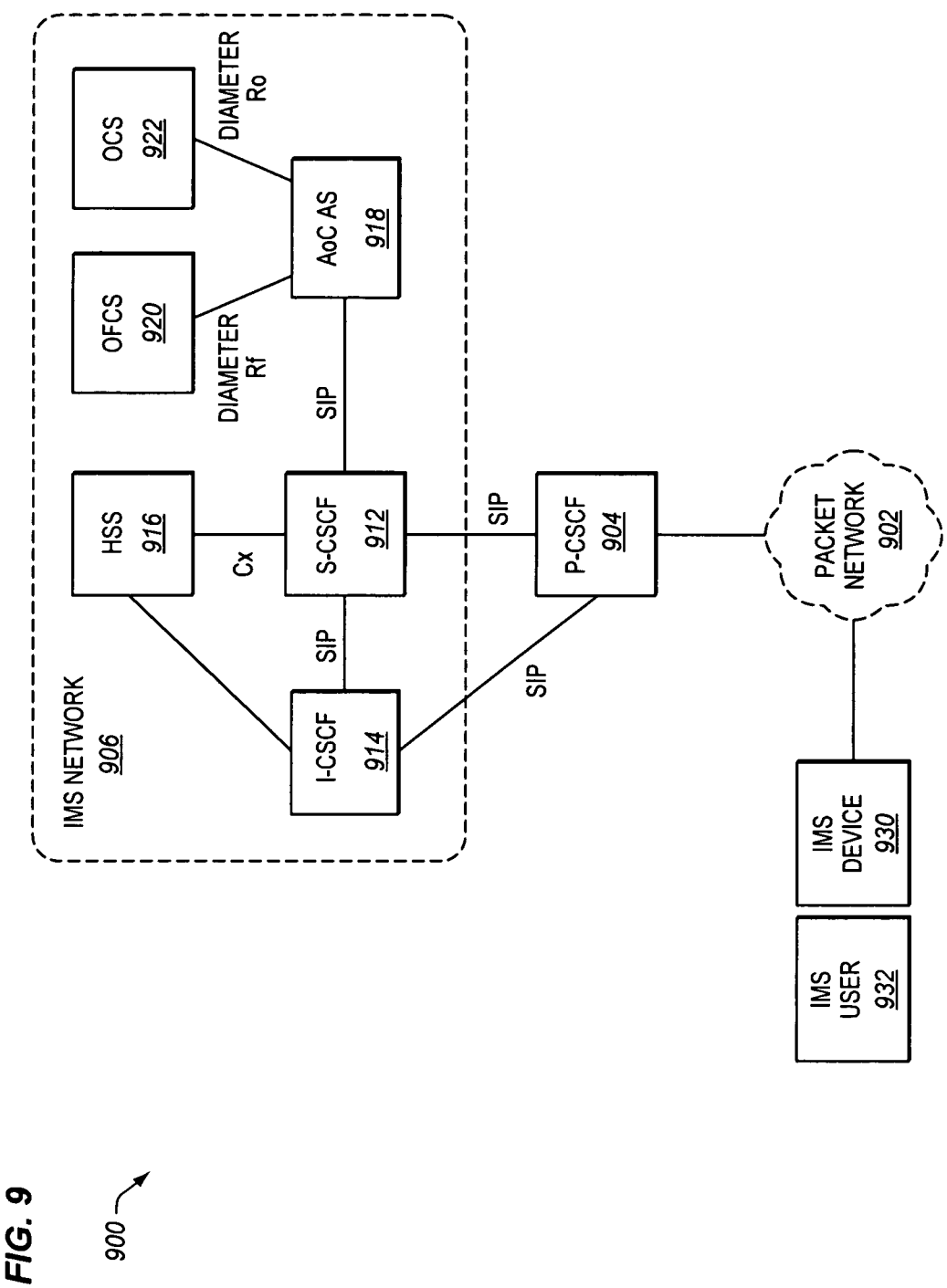
FIG. 9 illustrates a communication network in an exemplary embodiment of the invention.

FIGS. 9-12 illustrate an example of operating an IMS network to provide an AoC service. FIG. 9 illustrates a communication network 900 in an exemplary embodiment of the invention. Communication network 900 includes a packet network 902, a Proxy-CSCF (P-CSCF) 904, and an IMS network 906. IMS network 906 includes an S-CSCF 912, an Interrogate-CSCF (I-CSCF) 914, an HSS 916, an AoC application server (AS) 918, an OFCS 920, and an OCS 922. An IMS device 930 connects to IMS network 906 through packet network 902.

Figure 10:
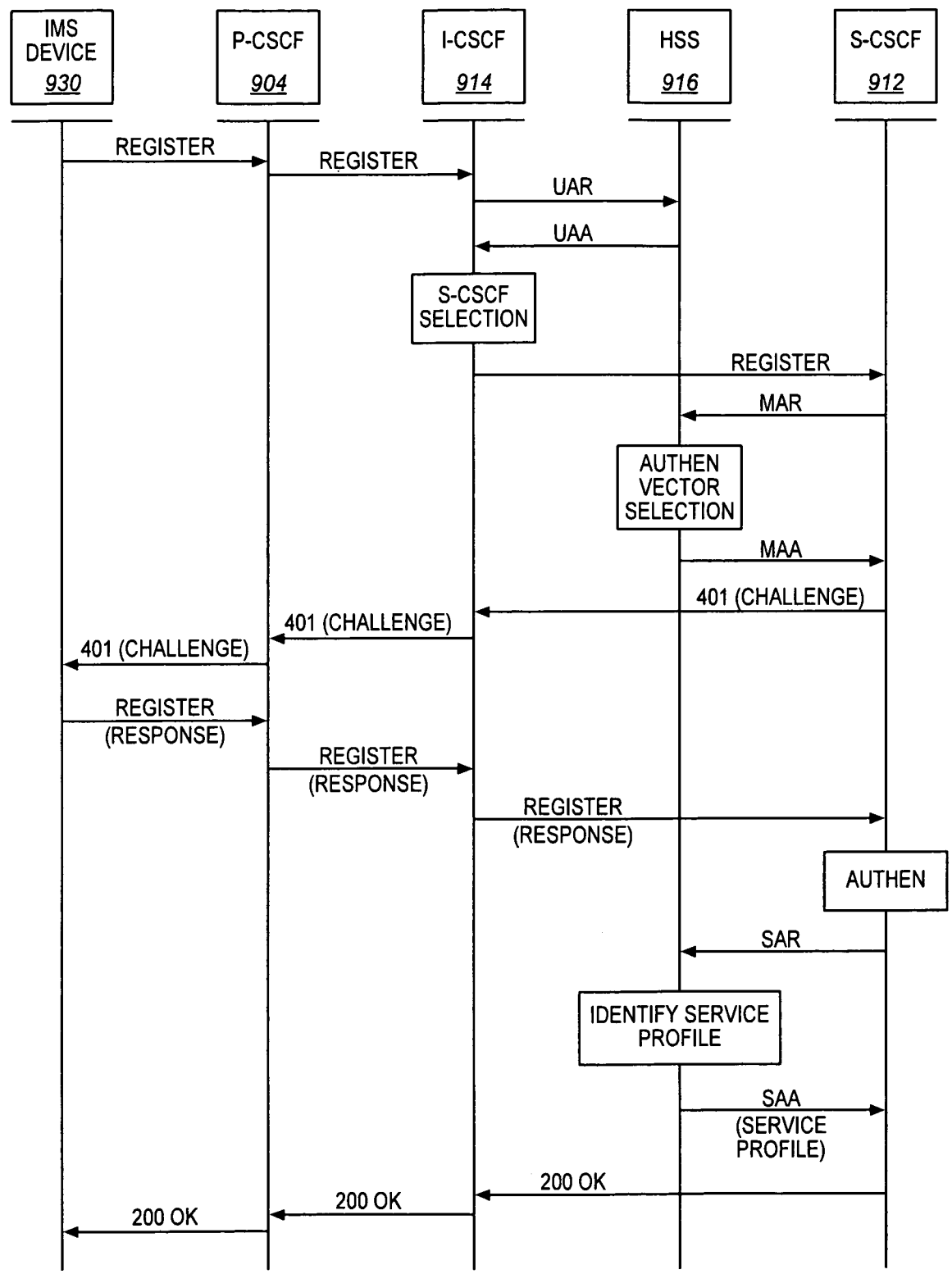
FIG. 10 is a message diagram illustrating messaging used to register an IMS device with an IMS network in an exemplary embodiment of the invention.

FIG. 10 is a message diagram illustrating messaging used to register IMS device 930 with IMS network 906 in an exemplary embodiment of the invention. To begin, IMS device 930 generates a SIP REGISTER in order to register with IMS network 906, and transmits the SIP REGISTER to P-CSCF 904 through packet network 902. P-CSCF 904 then transmits the SIP REGISTER to I-CSCF 914. Responsive to receiving the SIP REGISTER, I-CSCF 914 generates a Diameter User Authentication Request (UAR), and transmits the Diameter UAR to HSS 916. HSS 916 then responds to the UAR with a Diameter User Authentication Answer (UAA). Responsive to receiving the Diameter UAA, I-CSCF 914 selects the S-CSCF 912 to serve IMS device 930. I-CSCF 914 then transmits the SIP REGISTER to S-CSCF 912.

Responsive to receiving the SIP REGISTER, S-CSCF 912 generates a Diameter Multimedia Authentication Request (MAR) to continue the process of registering IMS device 930. S-CSCF 912 includes a private identifier (PRID) and/or a public identifier (PUID) in the Diameter MAR, and transmits the MAR to HSS 916. HSS 916 processes the PRID in the Diameter MAR to generate an AKA vector based on the AKA authentication method. HSS 916 then generates a Diameter Multimedia Authentication Answer (MAA) in response to the Diameter MAR, and includes the AKA vector in the Diameter MAA, such as in the SIP-Authenticate AVP of the MAA. Responsive to receiving the MAA, S-CSCF 912 transmits a SIP 401 (Challenge) message to IMS device 930 (through P-CSCF 904 and packet network 902) to challenge IMS device 930 for an authentication check. IMS device 930 receives the SIP 401, and calculates the authentication response. IMS device 930 then generates another SIP REGISTER (response) message and transmits the SIP REGISTER back to S-CSCF 912. Responsive to receiving the SIP REGISTER, S-CSCF 912 processes the authentication response in relation to the authentication vector to determine whether IMS device 930 is authenticated.

If IMS device 930 is authenticated, then S-CSCF 912 generates a Diameter Server Assignment Request (SAR) to retrieve the service profile for IMS user 932 of IMS device 930 from HSS 916. Responsive to receiving the Diameter SAR, HSS 916 identifies the service profile for IMS user 932 based on the PUID for IMS user 932. HSS 916 is pre-provisioned by the service provider so that the service profiles for IMS users that subscribe to AoC services include AoC indicators. The AoC indicators are each associated with a PUID of the IMS users. HSS 916 then generates a Diameter Server Assignment Answer (SAA), and includes the service profile for IMS user 932 in the Diameter SAA. HSS 916 then transmits the Diameter SAA to S-CSCF 912 over the Cx interface.

Responsive to receiving the Diameter SAA, S-CSCF 912 generates a SIP 200 OK message and transmits the 200 OK to IMS device 930 (through P-CSCF 904 and packet network 902). S-CSCF 912 also processes the Diameter SAA to identify the service profile for IMS user 932. S-CSCF 912 may then use the AoC indicator included in the service profile to provide AoC services for IMS user 932.

Figure 11:
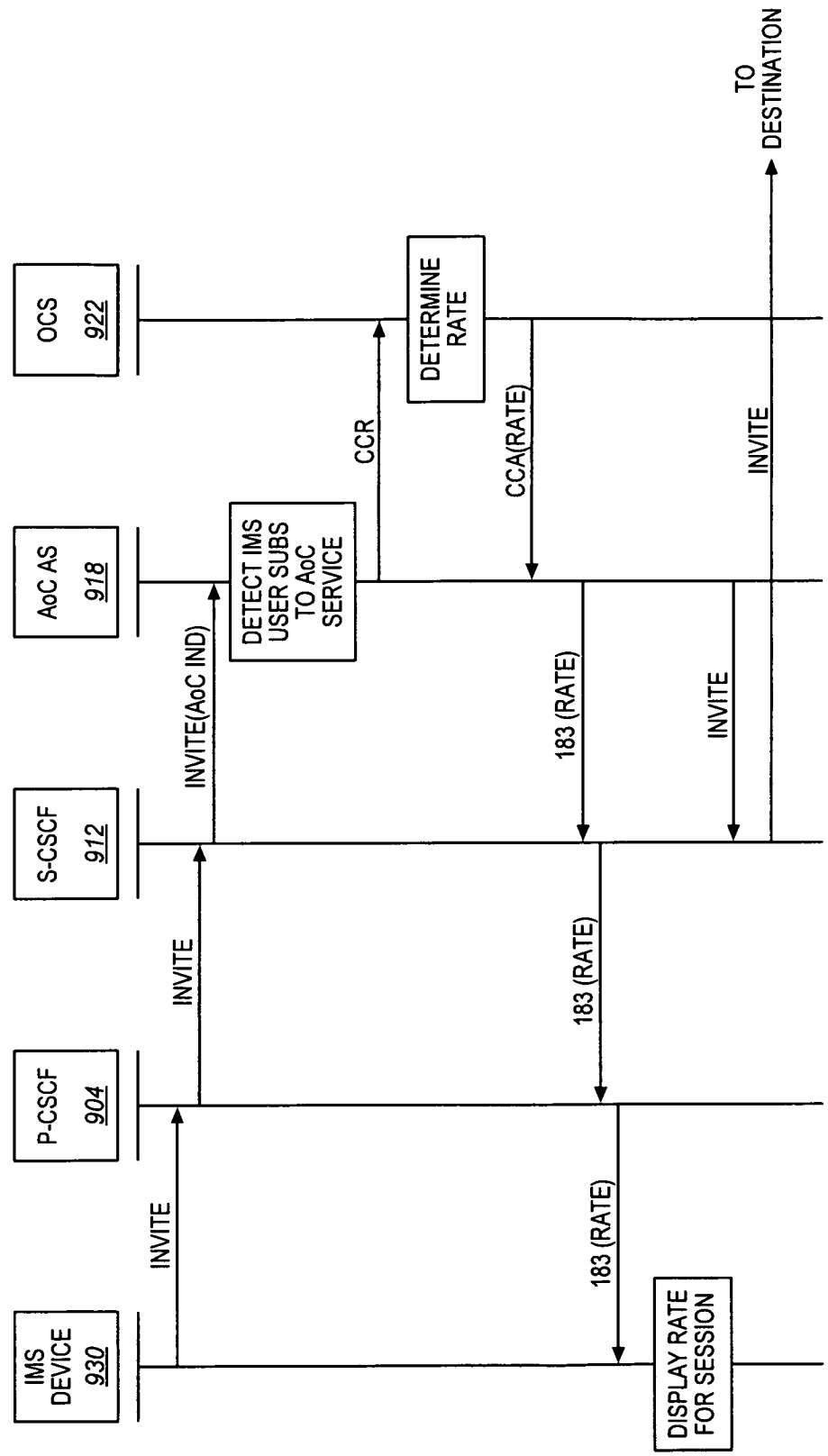
FIG. 11 is a message diagram illustrating a scenario where an IMS user receives AoC information at the beginning of a session in an exemplary embodiment of the invention.

FIG. 11 is a message diagram illustrating a scenario where IMS user 932 receives AoC information at the beginning of a session in an exemplary embodiment of the invention. Assume that IMS user 932 of IMS device 930 wants to initiate a session. To initiate the session, IMS device 930 generates a SIP INVITE, and transmits the SIP INVITE to P-CSCF 904 through packet network 902. P-CSCF 904 forwards the SIP INVITE to S-CSCF 912. S-CSCF 912 processes the service profile for IMS user 932 to determine whether IMS user 932 subscribes to an AoC service. If IMS user 932 subscribes to an AoC service, then S-CSCF 912 identifies the AoC indicator for IMS user 932 based on the PUID for IMS user 932. The service profile for IMS user 932 includes an AoC indicator, which is associated with the PUID for IMS user 932, so that S-CSCF 912 may identify the AoC indicator for IMS user 932 by processing the service profile. S-CSCF 912 then inserts the AoC indicator in the SIP INVITE, and transmits the SIP INVITE to AoC application server 918.

AoC application server 918 stores an AoC data structure that associates AoC indicators with AoC categories, where an AoC category defines the AoC service subscribed to by IMS users. AoC application server 918 receives the SIP INVITE from S-CSCF 912, which includes the AoC indicator for IMS user 932. AoC application server 918 processes the AoC indicator for IMS user 932 and the AoC data structure to identify an AoC category defined for the AoC indicator. The AoC category, which is identified through the AoC indicator, defines at least what type of AoC information that IMS user 932 desires to receive through the AoC service. The AoC category may also define how and when IMS user 932 desires to receive the AoC information. Assume for this example that the AoC category defines that IMS user 932 is to receive a rate for the session at the beginning of the session.

In response to identifying the AoC category, AoC application server 918 generates a Diameter Ro CCR requesting the rate for the session. AoC application server 918 then transmits the Diameter CCR to OCS 922. In response to the Diameter CCR, OCS 922 determines a rate for the session based on a rating engine. OCS 922 then generates a Diameter CCA, and inserts the rate for the session in the Diameter CCA. OCS 922 then transmits the Diameter CCA to AoC application server 918.

In response to the Diameter CCA, AoC application server 918 processes the Diameter CCA to identify the rate for the session that was inserted by OCS 922. AoC application server 918 generates a SIP 183, and inserts the rate for the session in the SIP 183. AoC application server 918 then transmits the SIP 183 to S-CSCF 912. S-CSCF 912 forwards the SIP 183 to IMS device 930 through P-CSCF 904 and packet network 902. In response to the SIP 183, an AoC application running on IMS device 930 processes the SIP 183 to extract the rate for the session, and provides the rate to IMS user 932 audibly and/or visually.

After transmitting the SIP 183 to IMS user 932, AoC application server 918 forwards the SIP INVITE to S-CSCF 912. S-CSCF 912 then forwards the SIP INVITE to the destination to attempt to establish the session.

Figure 12:
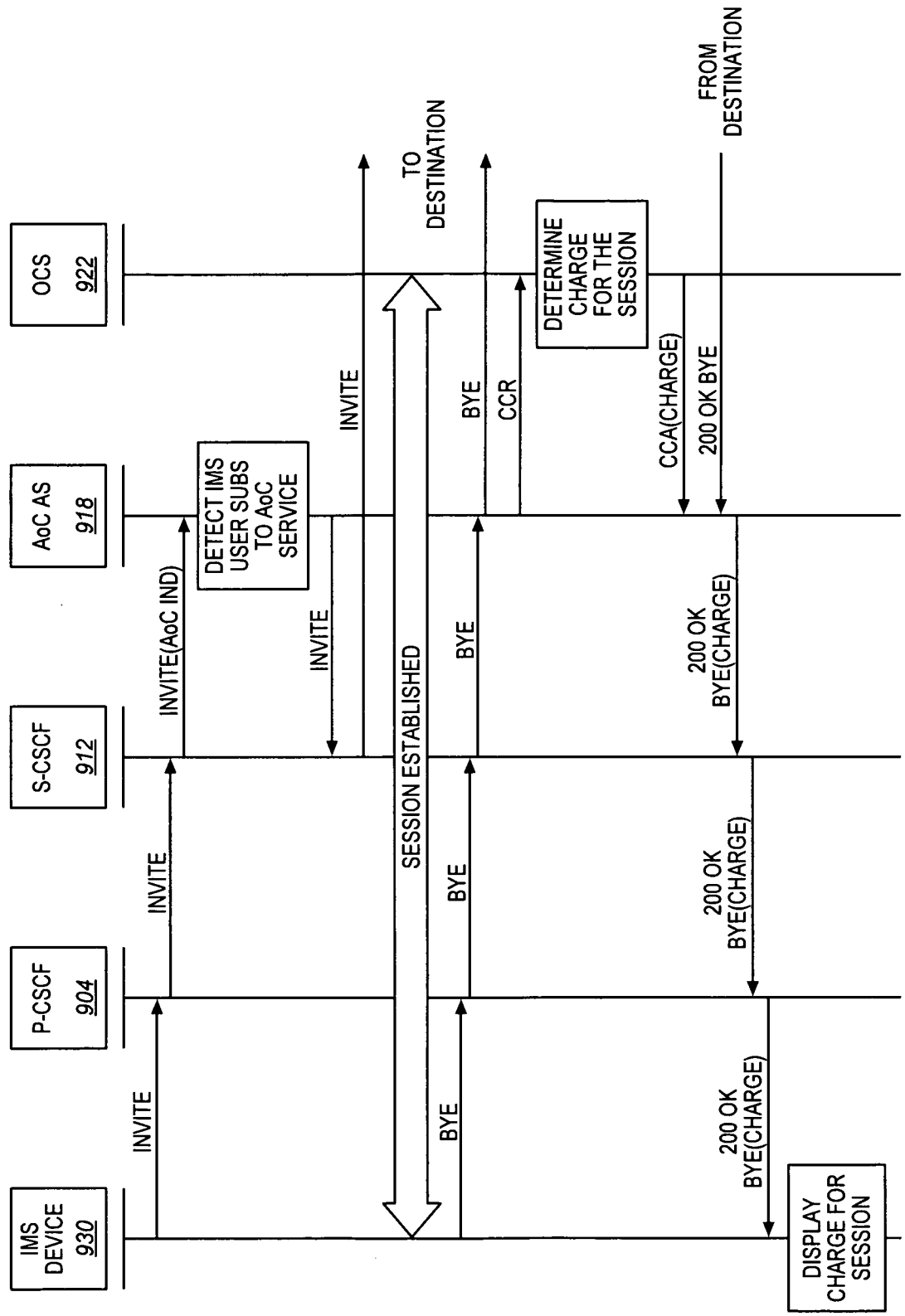
FIG. 12 is a message diagram illustrating a scenario where an IMS user receives AoC information at the end of a session in an exemplary embodiment of the invention.

FIG. 12 is a message diagram illustrating a scenario where IMS user 932 receives AoC information at the end of a session in an exemplary embodiment of the invention. Assume again that IMS user 932 of IMS device 930 wants to initiate a session. To initiate the session, IMS device 930 generates a SIP INVITE, and transmits the SIP INVITE to P-CSCF 904 through packet network 902. P-CSCF 904 forwards the SIP INVITE to S-CSCF 912. S-CSCF 912 processes the service profile for IMS user 932 to determine whether IMS user 932 subscribes to an AoC service. If IMS user 932 subscribes to an AoC service, then S-CSCF 912 identifies the AoC indicator for IMS user 932 based on the PUID for IMS user 932. S-CSCF 912 then inserts the AoC indicator in the SIP INVITE, and transmits the SIP INVITE to AoC application server 918.

In response to the SIP INVITE, AoC application server 918 processes the AoC indicator for IMS user 932 and the AoC data structure to identify an AoC category defined for the AoC indicator. Assume for this example that the AoC category defines that IMS user 932 is to receive accumulated charging for the session at the end of the session. In response to identifying the AoC category, AoC application server 918 determines that IMS user 932 is to receive the charging for the session at the end of the session, so AoC application server 918 forwards the SIP INVITE to S-CSCF 912. S-CSCF 912 then forwards the SIP INVITE to the destination to establish the session.

At some point, IMS device 930 generates a SIP END to end the session, and transmits the SIP END to P-CSCF 904 through packet network 902. P-CSCF 904 forwards the SIP END to S-CSCF 912. S-CSCF 912 then transmits the SIP END to AoC application server 918. In response to the SIP END, AoC application server 918 generates a Diameter Ro CCR requesting the charging for the session. AoC application server 918 then transmits the Diameter CCR to OCS 922. In response to the Diameter CCR, OCS 922 determines the accumulated charging the session. OCS 922 then generates a Diameter CCA, and inserts the charge for the session in the Diameter CCA. OCS 922 then transmits the Diameter CCA to AoC application server 918.

In response to the Diameter CCA, AoC application server 918 processes the Diameter CCA to identify the charge for the session that was inserted in the Diameter CCA by OCS 922. AoC application server 918 then receives a SIP 200 OK END from the destination acknowledging the end of the session. AoC application server 918 then inserts the charge for the session in the SIP 200 OK END. AoC application server 918 then transmits the SIP 200 OK END to S-CSCF 912. S-CSCF 912 forwards the SIP 200 OK END to IMS device 930 through P-CSCF 904 and packet network 902. In response to the SIP 200 OK END, an AoC application running on IMS device 930 processes the SIP 200 OK to extract the charge for the session, and provide the charge to IMS user 932 audibly and/or visually.

Although specific embodiments were described herein, the scope of the invention is not limited to those specific embodiments. The scope of the invention is defined by the following claims and any equivalents thereof.

We claim:
1. A system comprising:
 a subscriber database of an IP Multimedia Subsystem (IMS) network that is provisioned with Advice of Charging (AoC) indicators that indicate particular AoC ser- vices subscribed to by IMS users, wherein an AoC indicator is associated with an identifier for each of the IMS users;

the subscriber database is operable to receive a register request from a serving-call session control function (S-CSCF) as an IMS user attempts to register with the IMS network, to identify an AoC indicator for the IMS user responsive to receiving the register request, to insert the AoC indicator in a register response, and to transmit the register response to the S-CSCF to provide the AoC indicator for the IMS user to the S-CSCF.

2. The system of claim 1 wherein:

the subscriber database is connected to the S-CSCF through a Cx interface; and the subscriber database is further operable to transmit the register response, which includes the AoC indicator, to the S-CSCF over the Cx interface.

3. The system of claim 2 wherein:

the subscriber database is further operable to insert the AoC indicator in a User-Data Attribute Value Pair (AVP) of a Diameter Server Assignment Answer (SAA) message, and to transmit the Diameter SAA message to the S-CSCF over the Cx interface.

4. The system of claim 1 further comprising:

the S-CSCF that is operable to receive a signaling message for an IMS session involving the IMS user, to determine whether the IMS user subscribes to an AoC service, to identify the AoC indicator for the IMS user responsive to a determination that the IMS user subscribes to an AoC service, to insert the AoC indicator in the signaling message, and to transmit the signaling message to an AoC application server.

5. The system of claim 4 further comprising:

the AoC application server operable to store an AoC data structure that associates AoC indicators with AoC categories, where an AoC category defines the AoC service subscribed to by IMS users;

the AoC application server further operable to receive the signaling message from the S-CSCF that includes the AoC indicator, to process the AoC indicator and the AoC data structure to identify an AoC category defined for the AoC indicator for the IMS user, and to request AoC information from a charging system based on the AoC category for the IMS user.

6. The system of claim 5 wherein:

the AoC application server is further operable to generate a first charging message requesting the AoC information responsive to the signaling message, and to transmit the first charging message to the charging system; and the AoC application server is further operable to receive a second charging message from the charging system that includes the AoC information.

7. The system of claim 5 wherein:

the AoC application server is further operable to receive the AoC information from the charging system, and to provide the AoC information to the IMS user.

8. The system of claim 1 wherein:

the subscriber database is further operable to store the AoC indicators for the IMS users in a service profile for the IMS users, wherein each IMS user identifier of the IMS users are associated with one AoC indicator.

9. A method of providing Advice of Charging (AoC) services in an IP Multimedia Subsystem (IMS) network, the method comprising:

provisioning a subscriber database of the IMS network with AoC indicators that indicate particular AoC services subscribed to by IMS users, wherein an AoC indicator is associated with an identifier in the subscriber database for each of the IMS users;

receiving a register request in the subscriber database from a serving-call session control function (S-CSCF) as an IMS user attempts to register with the IMS network;

identifying, in the subscriber database, an AoC indicator for the IMS user responsive to receiving the register request;

inserting the AoC indicator in a register response; and transmitting the register response from the subscriber database to the S-CSCF to provide the AoC indicator for the IMS user to the S-CSCF.

10. The method of claim 9 wherein transmitting the register response from the subscriber database to the S-CSCF comprises:

transmitting the register response, which includes the AoC indicator, from the subscriber database to the S-CSCF over a Cx interface.

11. The method of claim 10 wherein transmitting the register response from the subscriber database to the S-CSCF comprises:

inserting the AoC indicator in a User-Data Attribute Value Pair (AVP) of a Diameter Server Assignment Answer (SAA) message; and transmitting the Diameter SAA message from the subscriber database to the S-CSCF over the Cx interface.

12. The method of claim 9 further comprising:

receiving a signaling message for an IMS session involving the IMS user in the S-CSCF;

determining whether the IMS user subscribes to an AoC service;

identifying the AoC indicator for the IMS user responsive to a determination that the IMS user subscribes to an AoC service;

inserting the AoC indicator in the signaling message; and transmitting the signaling message from the S-CSCF to an AoC application server.

13. The method of claim 12 further comprising:

storing an AoC data structure in the AoC application server that associates AoC indicators with AoC categories, where an AoC category defines the AoC service subscribed to by IMS users;

receiving the signaling message in the AoC application server from the S-CSCF that includes the AoC indicator;

processing the AoC indicator and the AoC data structure to identify an AoC category defined for the AoC indicator for the IMS user; and requesting AoC information from a charging system based on the AoC category for the IMS user.

14. The method of claim 13 wherein requesting AoC information from a charging system based on the AoC category for the IMS user comprises:

generating, in the AoC application server, a first charging message requesting the AoC information responsive to the signaling message;

transmitting the first charging message from the AoC application server to the charging system; and receiving a second charging message in the AoC application server from the charging system that includes the AoC information.

15. The method of claim 13 further comprising:

receiving the AoC information in the AoC application server from the charging system; and providing the AoC information to the IMS user.

16. The method of claim 9 wherein storing AoC indicators for IMS users that subscribe to an AoC service in a subscriber database comprises:

storing the AoC indicators for the IMS users in a service profile for the IMS users, wherein each IMS user identifier of the IMS users are associated with one AoC indicator.

17. A subscriber database of an IP Multimedia Subsystem (IMS) network, the subscriber database comprising:

a storage system operable to store service profiles for IMS users that subscribe to Advice of Charging (AoC) services; and a processing system operable to receive AoC indicators for the IMS users that indicate particular AoC services subscribed to by the IMS users, wherein the AoC indicators are each associated with an IMS user identifier (ID) of an IMS user, and to store the AoC indicators in service profiles for the IMS users along with its associated IMS user ID;

the processing system is further operable to receive a register request from a serving-call session control function (S-CSCF) for an IMS user registering with the IMS network, to identify a service profile for the IMS user based on an IMS user ID included in the register request, to insert the service profile in a register response, and to transmit the register response to the S-CSCF.

18. The subscriber database of claim 17 wherein:

the processing system is further operable to exchange the register request and register response with the S-CSCF over a Cx interface.

19. The subscriber database of claim 18 wherein the IMS user IDs comprise Public User Identifiers (PUID), and the PUIDs are each associated with only one AoC indicator in a service profile.

\* \* \* \* \*